United States Patent [19]

Kavalieros

[11] 4,389,835

[45] Jun. 28, 1983

[54] SAFETY HOPPLES

[76] Inventor: Tony Kavalieros, 14 East Street, Marrickville, New South Wales, 2204, Australia

[21] Appl. No.: 289,528

[22] Filed: Aug. 3, 1981

[30] Foreign Application Priority Data

Aug. 7, 1980 [AU] Australia .............................. PE4919

[51] Int. Cl.[3] ........................ B68B 1/00; A01K 15/00

[52] U.S. Cl. .......................................... 54/71; 119/126

[58] Field of Search ........................ 119/126, 127, 128; 54/71, 72

[56] References Cited

U.S. PATENT DOCUMENTS

| | | | |
|---|---|---|---|
| 408,436 | 8/1889 | Reid | 54/71 |
| 2,814,923 | 12/1957 | Knauss | 54/71 |
| 3,174,261 | 3/1965 | Calderhead | 119/126 X |

*Primary Examiner*—Robert P. Swiatek

*Attorney, Agent, or Firm*—Michael J. Striker

[57] ABSTRACT

A hopple for horses to maintain the pacing gait of the horse. Hopples of this type comprising four ovate hopple members each of which is adapted to surround one leg of a horse to which the hopple is fitted, each of which hopple members is provided at each end with a riser strap carrying a buckle used to connect the riser strap to a supporting strap passing over the horse. The present invention is characterized in that at least some of the supporting straps are bifurcated at their ends and the corresponding riser straps are provided with a pair of buckles. The bifurcated supporting strap substantially eliminates the problem of a hopple member breaking free from its associated supporting strap and falling down thereby tripping the horse.

5 Claims, 3 Drawing Figures

SAFETY HOPPLES

The present invention relates to a hopple for pacing horses, and more particularly to a hopple used on a pacer horse to maintain the pacing gait of the horse.

Hopples conventionally comprise four horizontally disposed, spaced, hopple members lying in a common plane. Each hopple member is adapted to surround and fetter one leg of the horse. The hopple members on the left side of the animal are connected together by an adjustment strap and similarly the hopple members on the right side of the animal are interconnected. It is customary to suspend the hopple members by supporting straps passing over the body of the horse. Such a hopple is shown in U.S. Pat. Nos. 3,174,261 and 1,455,341.

Such hopples may be subjected to very great strains in use if the horse "breaks" and tries to change its gait. It has been found that if one of the supporting straps breaks the hopple member can slip down around the pastern or common of the leg and trip the horse up. If a horse is so tripped the animal will almost always break a leg and have to be destroyed. It is also very dangerous for the driver of the horse as he can be thrown from his sulky and injured in the event of the horse falling. This danger is increased in a racing situation where both horse and driver could be run over and trampled by a following horse.

The present invention is designed to substantially reduce the danger of one of the hopple members being allowed to drop around the lower part of the horses leg. It should be realised that it is imperative that the hopple should not interfere with the free movement of the horse so long as it maintains a pacing gait, should not be too heavy, and should not chafe or otherwise hurt the horse. The arrangement according to the present invention can satisfy all three of the foregoing requirements while substantially reducing the danger to horse and driver outlined above.

The present invention consists in a hopple for a horse comprising four ovate hopple members each of which is adapted to surround one leg of a horse and is provided at or adjacent each end with a riser strap having connector means to connect the hopple member to supporting strap means adapted to be positioned about the horse and to support the hopple member in a substantially horizontal plane about one of the animals legs, the hopple being characterised in that at least one of the hopple supporting strap means is longitudinally bifurcated and the or each corresponding riser strap is provided with a second and independent connector means, one of the bifurcated portions of the strap means being connected to each of the connector means.

It is preferable that both supporting straps connected to each hopple member are bifurcated and that both of the riser straps on each hopple member are provided with two buckles for connection to the two portions of the corresponding supporting strap.

Considerable advantage can still be obtained, however, if only the front supporting strap for the front hopple members and the rear supporting straps for the rear hopple members are bifurcated. This is because there is less chance of the ends of the hopple member which are connected together by the adjustment strap dropping sufficiently to trip the horse.

While for simplicity and recognised security it is preferable to connect the supporting strap to the hopple members through conventional tongued buckles other connection means could be provided. The other connection means could include tongueless buckles, press studs, and the like.

The bifurcation of the supporting strap is preferably brought about by sewing or riveting onto a conventional strap an additional tail such that the end portion of the strap and the tail lie in parallel overlapping relationship. As the buckles on the riser strap of the hopple member will be spaced apart vertically it is preferable to have one portion of the supporting strap longer than the other. It is desirable to connect the main or continuous portion of the strap to the upper buckle of the riser strap and to connect the added-on tail portion of the strap to the lower buckle. The tail portion may be so connected that it does not carry any of the weight of the hopple member unless the main portion of the supporting strap breaks or comes undone from the buckle. In an alternative embodiment of the invention a single supporting strap may be slit longitudinally at its end to provide the bifurcation.

The hopple according to this invention may be made of any suitable material. Traditionally hopples have been made of leather, however, more recently webbing of a woven synthetic plastics material has been used. Either of these materials may advantageously be used in constructing the invention according to the present invention.

Hereinafter given by way of example only is a preferred embodiment of the present invention described with reference to the accompanying drawings in which.

Figure 1:
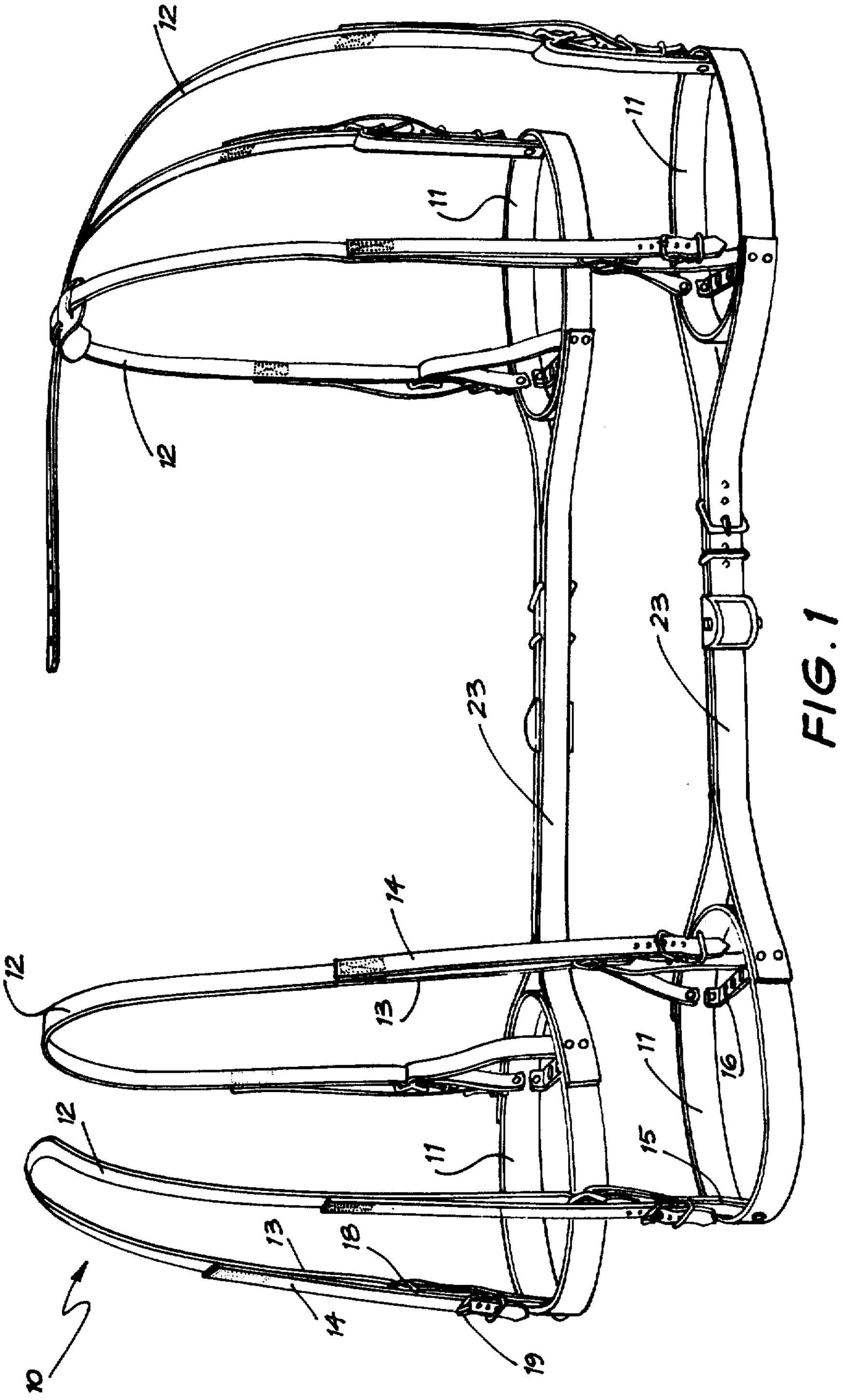
FIG. 1 is a perspective view of a hopple according to this invention.
Figure 3:
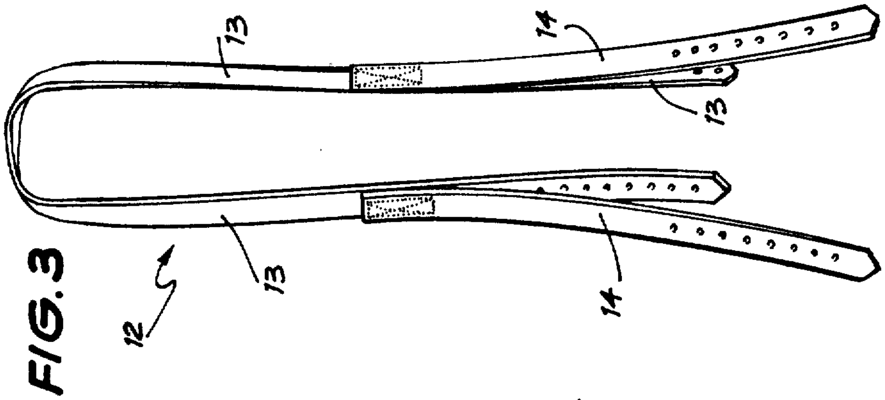
FIG. 3 is a perspective view of an intermediate one of the supporting straps of the hopple as shown in FIG. 1.
Figure 2:
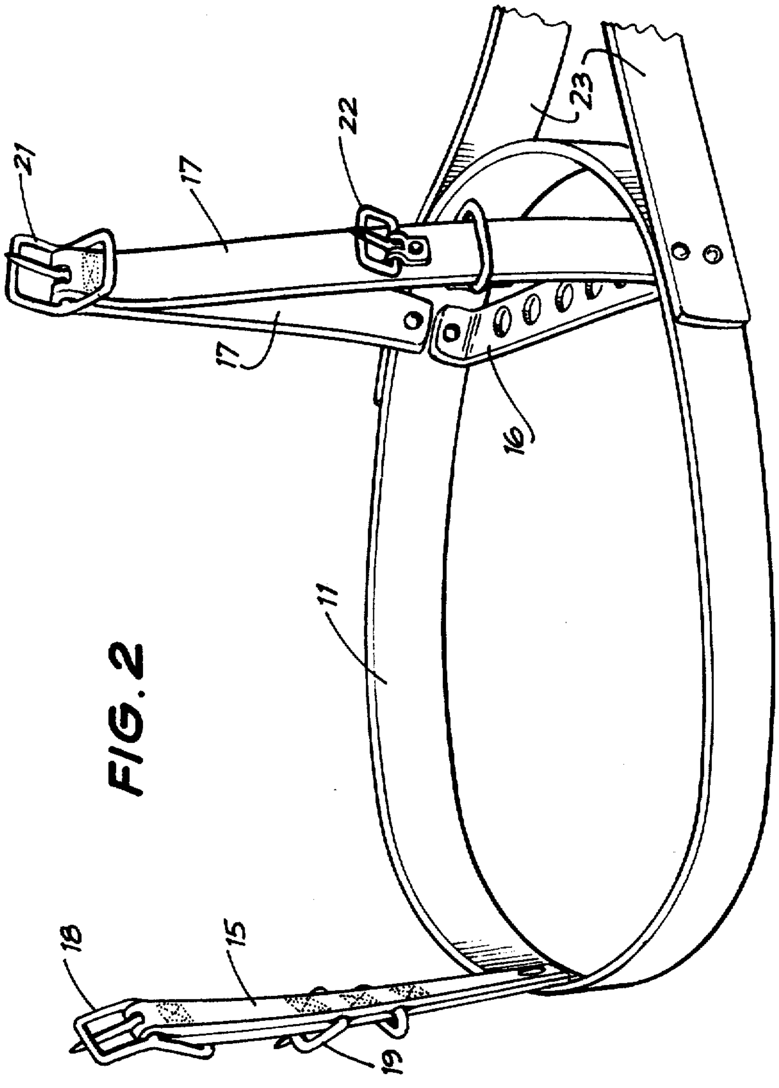
FIG. 2 is a perspective view of the left front hopple member of the hopple as shown in FIG. 1.

The hopple 10 comprises four hopple members 11, each of which is adapted to surround one leg of a horse, and four sets of supporting straps 12.

Each set of supporting straps comprises a main strap 13 to which are sewn two supplementary straps 14. Each supplementary strap 14 extends longitudinally of the main strap 13 and overlies one end thereof.

Each of the hopple members 11 is ovate and has in its mid-line at one end a single upstanding riser strap 15 and at its other end has a bridging strap 16 and a pair of riser straps 17 which converge and are joined together at their upper end.

The riser strap 15 carries a conventional tongued buckle 18 at its upper end and a ½ buckle 19 spaced slightly below the upper buckle. Similarly the riser straps 17 carry at their upper end a tongued buckle 21 and on the straps 17 which in use will be further from the body of the horse a further ½ buckle 22 disposed below the buckle 21. A conventional keeper is disposed below each of the ½ buckles 19 and 22.

In use a strap 12 is buckled to each of the buckles 18 and 21 while a supplementary strap 14 is buckled to each of the ½ buckles 19 and 22.

As is seen in FIG. 1 the front and rear hopple members 11 on each side of the animal are connected together by conventional, adjustable connecting straps 23.

I claim:

1. A hopple for a horse, comprising four ovate hopple members each of which is adapted to surround one leg of a horse and is provided at or adjacent each end with a riser strap having first connector means to connect the hopple member to supporting strap means adapted to be positioned about the horse and to support the associated hopple member in a substantially horizontal plane about one of the animal's legs, the hopple being characterized in that at least the front one of the riser straps of each of the front hopple members and the rear one of the riser straps of each of the rear hopple members is provided with a second and independent connector means below said first connector means, the corresponding supporting strap means being longitudinally bifurcated, one of the bifurcated portions of each of the said strap means being connected to each of the first connector means of the corresponding riser strap, the other of the bifurcated portions of each of the said strap means being connected to each of the second connector means of the corresponding riser strap said strap means and the corresponding riser straps being such that in the event that the connection between one of the first connector means and a corresponding one of the bifurcated portions of the strap means is broken the corresponding hopple member will be retained in a substantially horizontal plane by the other of the bifurcated portions of that strap means.

2. A hopple as claimed in claim 1 in which the supporting strap means connected to each end of each hopple member are bifurcated.

3. A hopple as claimed in claim 1 in which each connector means comprises a tongued buckle.

4. A hopple as claimed in claim 1 in which the, or each, bifurcated supporting strap means comprises a main portion and a tail portion connected to the main portion at a distance from a free end thereof and lies parallel to and overlapping the main portion of the strap means between its point of connection to the tail portion and its free end.

5. A hopple for a horse, comprising four ovate hopple members each of which is adapted to surround one leg of a horse and is provided at or adjacent each end with a riser strap having connector means to connect the hopple member to supporting strap means adapted to be positioned about the horse and to support the associated hopple member in a substantially horizontal plane about one of the animal's legs, at least one of the hopple supporting strap means being longitudinally bifurcated and the or each corresponding riser strap being provided with a second and independent connector means, one of the bifurcated portions of each of the strap means being connected to each of the connector means of the corresponding riser strap, each of the bifurcated supporting strap means comprising a main portion and a tail portion connected to the main portion at a distance from a free end thereof and lies parallel to and overlapping the main portion of the strap means between its point of connection to the tail portion and its free end.

* * * * *